United States Patent [19]

Wei

[11] 4,129,358
[45] Dec. 12, 1978

[54] OPTICAL SYSTEM FOR IMAGING AN ELONGATE OBJECT IN REARRANGED SECTIONS

[75] Inventor: John S. S. Wei, Ottawa, Canada

[73] Assignee: Northern Telecom Limited, Montreal, Canada

[21] Appl. No.: 801,105

[22] Filed: May 27, 1977

[51] Int. Cl.² .............................................. G02B 27/14
[52] U.S. Cl. .................................... 350/173; 350/285; 350/286
[58] Field of Search ....................... 350/173, 6, 7, 171, 350/285, 62, 112, 202, 203; 358/11, 53, 54, 55; 356/113

[56] References Cited

U.S. PATENT DOCUMENTS

| | | | |
|---|---|---|---|
| 2,866,377 | 12/1958 | Rantsch | 356/113 |
| 3,047,871 | 7/1962 | Hider et al. | 350/112 |
| 3,218,916 | 11/1965 | Saunders | 356/113 |
| 3,614,212 | 10/1971 | Hock | 350/285 |
| 3,838,912 | 10/1974 | Arimoto et al. | 350/285 |
| 3,844,638 | 10/1974 | Lingenfelder et al. | 350/171 |
| 4,009,940 | 3/1977 | Ohzu | 356/113 |

FOREIGN PATENT DOCUMENTS 569118  12/1944  United Kingdom .................. 350/171

Primary Examiner—John K. Corbin
Assistant Examiner—B. W. de los Reyes
Attorney, Agent, or Firm—Sidney T. Jelly

[57] ABSTRACT

An optical system for imaging an elongate object comprises at least two prisms back to back and means for laterally displacing light rays from part of the image prior to passage through the prisms, so that a series of images are formed in side-by-side arrangement. The images will be displaced relative to each other in the direction of the longitudinal axis of the object but are still overlapping so that a section across the images will include all of the object. By increasing the number of prism pairs, further apparent subdivision of the object can be obtained.

7 Claims, 7 Drawing Figures

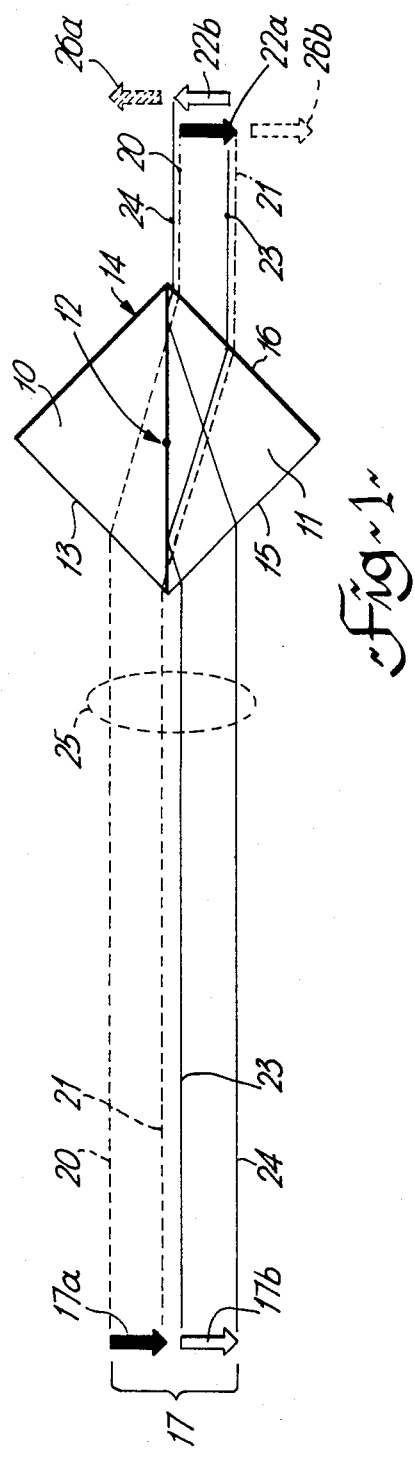
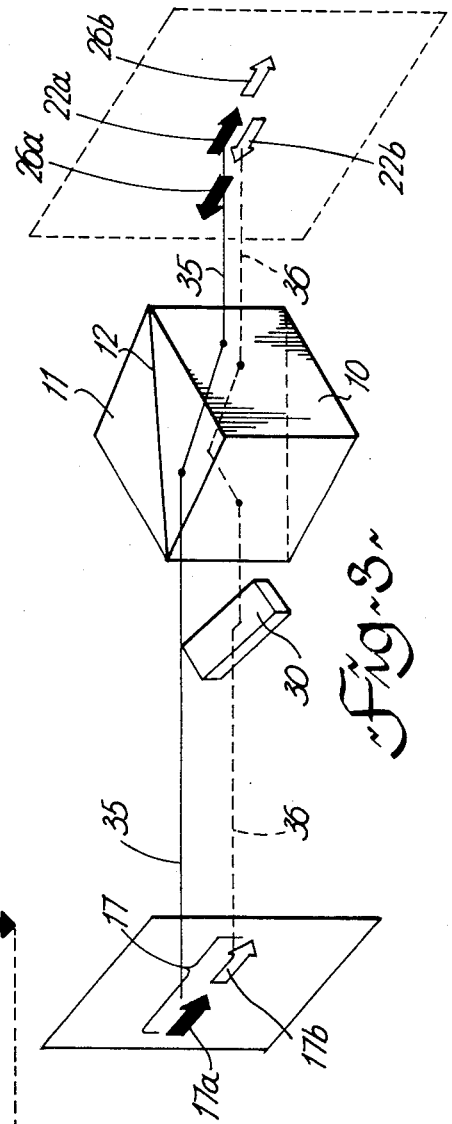
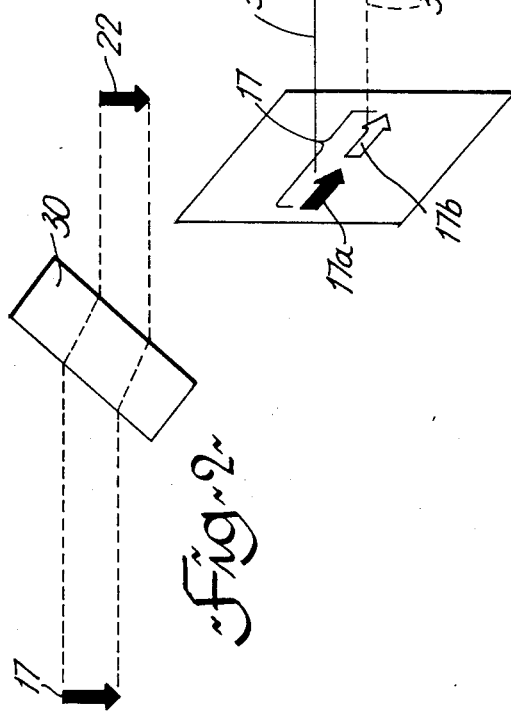
Fig-1
Fig-2
Fig-3

OPTICAL SYSTEM FOR IMAGING AN ELONGATE OBJECT IN REARRANGED SECTIONS

This invention relates to an optical system for imaging an elongate object in rearranged sections, and particularly relates to the imaging of a line across a page by rearranging the image into a plurality of sections in a stacked or side-by-side arrangement.

The difficulty and cost of making a solid state or any other type of imager usually increase with the size, either the length or the area, of the imager. If the spatial extention of the image and hence the imager length can be reduced, advantages can be gained in the materials reliability and manufacture of the imager.

Imagers are frequently used in scanning or reading apparatus such as copiers and facsimile machines. In those applications it is sometimes necessary to image a thin linear section of the page, either along the width or the length, onto an imager array. For example, a thin section across the 8½ inch width of an ordinary page is imaged onto a solid state imager array having 1728 elements. The lengths of the imager arrays are close to one inch and their widths about one hundreth of an inch. If the imager is made of silicon for instance, the material uniformity, distribution of defects, processing and reliability in general place severe limits on the fabrication yield of imager chips that are long and thin. An improvement in fabrication yield would be possible if the imager chips need not be as long as one inch.

The present invention can be used to design an imager array having less disparity between the width and the length in the detector area. At the same time, such an imager would retain all functions of a longer imager array.

The invention uses prisms, or other light "bending" devices, to deflect the light rays and to cause lateral displacement of sections of a linear object. The number of prisms and/or other devices used can vary according to the number of sections the object is to be divided into, and the particular relative displacement and final image form.

The invention will be readily understood by the following description of various embodiments, by way of example, in conjunction with the accompanying diagrammatic drawings, in which:

FIG. 1 is a plan view of two prisms producing a set of imagers inverted and laterally displaced with respect to each other;

FIG. 2 illustrates displacement of an image by a glass plate;

FIG. 3 is a perspective view of a system combining the features of FIGS. 1 and 2 to give inversion, lateral displacement and height displacement of an image;

Figure 6:
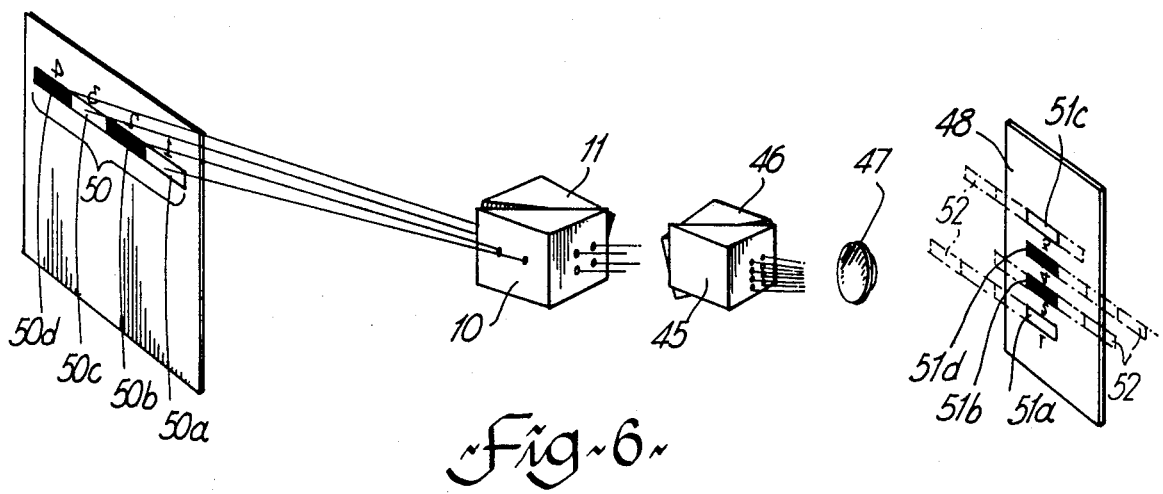
FIG. 6 is a perspective view of a system for obtaining quadruple folding of an image.
Figure 7:
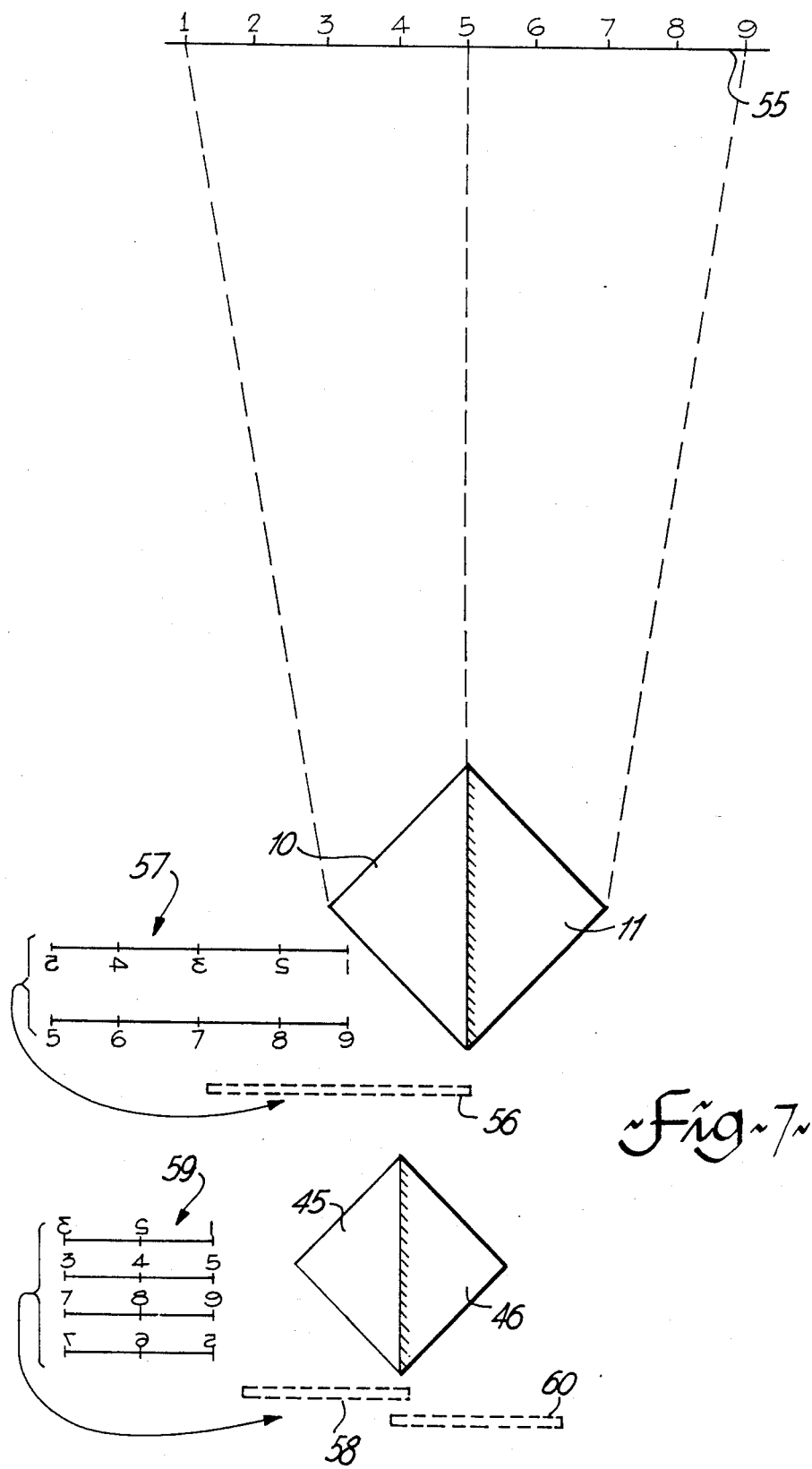

FIG. 7 diagrammatically illustrates the related positions of the various sections of a linear object as produced by the system of FIG. 6.

In FIG. 1 are illustrated two prisms 10 and 11, their base surfaces forming a common interface 12. Prism 10 has sides 13 and 14 at right angles to each other and at 45° to the interface 12, and prism 11 has sides 15 and 16 at right angles to each other and at 45° to the interface 12. The prisms can be cemented together or merely in contact at the inteface. One of the prism base surfaces at the interface is half-silvered, or coated with a 50% reflection coating. The object 17 is represented by the two arrows 17a and 17b.

Rays 20 and 21 from 17a pass through the prisms 10 and 11 with a displacement in the same direction as that indicated by the object arrow 17a. The image of 17a appears as 22a. The rays 23 and 24 from 17b are partially reflected at the interface 12 when passing through prism 11. The image of 17b is inverted and appears as 22b. In practice a lens, indicated in dotted outline at 25, can be used to collect all the rays from the object 17, not only the parallel rays shown. The focussed images can be read at an imager.

In the arrangement of FIG. 1, if the object 17 is aligned on a line perpendicular to the plane of the interface 12 and equally spaced about the interface, images 22a and 22b will be superimposed. Actually, the combination of prisms and interface, as illustrated in FIG. 1, will produce double images as a viewer at the imager position can observe objects through faces 13 and 15 simultaneously. Therefore, a further image, composed of two superimposed images of 17a and 17b will be produced, displaced from that illustrated in FIG. 1 at 22a and 22b. In this second image, indicated in dotted outline at 26a and 26b, the image is reversed compared to 22a and 22b.

An image can be displaced laterally, in a direction normal to the longitudinal axis of the object, by a parallel sided glass plate, as illustrated in FIG. 2. Glass plate 30 is inclined relative to the object 17a and the lateral displacement of the image 22 is related to the inclination of the plate relative to the plane of the object 17.

The lateral displacement obtained by a glass plate can be combined with the subdivision obtained by two prisms to give both division and separation. This is illustrated in FIG. 3. For clarity, only a ray representing the centre of each section 17a and 17b of the object 17 is illustrated, at 35 and 36 respectively. It will be seen that instead of the images of the two object sections being superimposed, one section, 22b, is displaced laterally relative to the other, 22a. This is obtained by the displacement of the rays from object section 17b prior to entering the prism 11, by the glass plate 30. Two sets of images are again formed, as described with respect to FIG. 1, and the second set of images are indicated at 26a and 26b.

For use as a reader, or scanner, either set of images, 22a and 22b or 26a and 26b, can be used. The detector, or imager, length is halved in the example of FIG. 3 as only the overlapping section of the images are used. By repeating the prism arrangement, it is possible to further subdivide, giving a length one quarter of what would otherwise be required.

Figure 4:
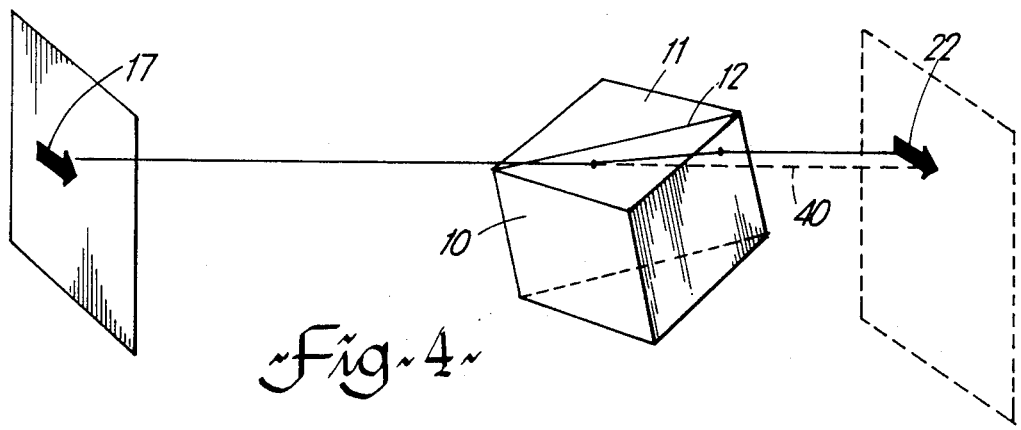
FIG. 4 illustrates the use of prisms to give displacement.

Displacement of an image can also be obtained by tilting the prisms, as illustrated in FIG. 4. The image 22 is displaced, the displacement of image 22 in FIG. 4, relative to the object 17, is shown related to a normal undisplaced position which would occur at the image plane of the end of dotted line 40.

Figure 5:
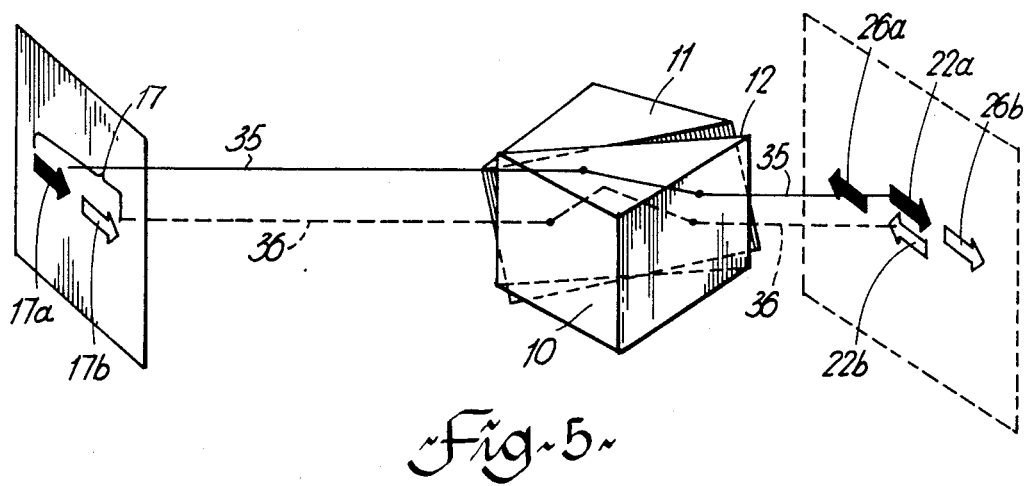
FIG. 5 illustrates a modification of FIG. 4.

By tilting and rotation of the prisms, both division and displacement can be obtained. This is illustrated in FIG. 5. Prism 10 is rotated relative to prism 11, on the interface 12. The images are overlapped and also displaced, in the same manner as in FIG. 3. Two sets of images are again produced, 22a and 22b, and 26a and 26b. Repetition of the prism arrangement of FIG. 5 will also give further overlapping of the images.

The above arrangements for subdivision of a linear object into separate sections, and displacement of these sections, to provide what can be termed an "area image" rather than a linear image, is illustrated in relation to a line scanning device in FIG. 6. Two sets of prisms are provided, 10 and 11 and 45 and 46, to give quadruple folding. The prisms 10 and 11 separate the image sections by a larger amount than prisms 45 and 46. A lens 47 is used to focus the images on a detector 48. A sheet of paper, or other planar member, is indicated at 49 with a linear object, such as a line of print, indicated at 50. The line 50 is shown divided into four sections 50a, 50b, 50c and 50d. One set of images is shown on the detector 48, at 51a, 51b, 51c and 51d. While image sections 51a and 51b, representing object sections 50a and 50b respectively, are sequential, image sections 51c and 51d, representing object sections 50c and 50d respectively, are transposed, with 51d between 51b and 51c.

It should be appreciated that actually four complete images are formed, each image a complete reproduction of the entire object. However, the images are displaced, in the direction of the longitudinal axis of the object, but overlapping in such a way, that a section extending across all the images will contain a different part of the object, thus giving the effect of a divided, or sectioned image. The actual extent of all the images is indicated, by way of example only, by dotted lines 52 in FIG. 6.

The amount of rotation, and the sense of rotation, of one prism relative to another in a pair of prisms, will determine the image arrangement provided.

FIG. 7 illustrates, very diagrammatically, the detailed line rearrangement of a system as in FIG. 6. In FIG. 7, the prisms are shown in outline and their tilt and relative rotation are not indicated, this being illustrated in FIG. 6. A line 55, representative of a linear object such as a line of printing, is indicated, divided into eight sections, the ends of the section numbered 1 to 9. One set of images only is shown, and only the overlapping sections of this set. Thus, after the rays from line 55 have passed through the prisms 10 and 11, a first image 56 could be observed by an observer at this position. The image would be as indicated at 57. After the rays have passed through the further prisms 45 and 46, a second image could be observed at 58 by an observer at this position. The image would have the form as indicated at 59, bearing in mind that four complete images are actually formed staggered laterally, with one section in each image overlapping — as indicated in FIG. 6. The numbers at the section ends of the line 55 are shown as they would be, that is reversed where this is so. It will be appreciated that a second set of images could be observed if an observer was looking at the right hand side of FIG. 7, instead of the left hand side, ie., as indicated at 60. The image at 60 has been displaced slightly in FIG. 7, for clarity, but would be in alignment with 58.

In practice, one of the images produced in the various arrangements would be imaged on some form of detector, for example a charge coupled device (CCD) array. By suitable electronic control, the image would be scanned so that the sections of the image would be read in the correct sequence. Alternatively, additional optical devices could be used to provide sequential imaging, and even to overcome the reversal of some sections, but it should be noted that some loss of power could occur if additional optical devices were incorporated.

While the prisms 10 and 11 and 45 and 46 have been shown as right-angle prisms, with the other angles at 45°, these angles can vary. However, selection of the angle is desirably such as will reduce a stygmatism, and 45° for the base angle is a good compromise.

The positioning of the prisms relative to the object, is not critical but rotation of the prisms relative to each other, and alignment of the prisms relative to each other, is more critical. As described, rotation of the prisms is not essential as glass slices can be used to provide displacement.

What is claimed is:

1. An optical system for imaging an elongate object in rearranged sections extending side-by-side, comprising:
   a pair of prisms, each prism having a base surface and two side surfaces inclined at an acute angle to said base surface, the two prisms in abutting relationship and having a common interface formed by said base surfaces, one of said base surfaces having a 50% reflective coating thereon, the plane of said interface aligned with the centre of the object and extending normal to the longitudinal axis of the object, a light path passing from the object through both prisms, a part through each prism;
   an imaging device spaced from and optically aligned with said pair of prisms;
   a lens structure positioned between said prisms and said imaging device, to produce an image of said sections on said imaging device; and
   means for displacing the part of the light path from said object passing through one of said prisms to said imager, said part displaced in a direction normal to the longitudinal axis of the object, the part of the light path passing through the other prisms undisplaced in said direction;
   whereby a first image is formed by said displaced part of said light path and a second image is formed by the undisplaced part of the light path, said images displaced longitudinally and laterally relative to each other.

2. An optical system as claimed in claim 1, said means for displacing a part of the light path comprising the arrangement of one of said prisms in a fixed rotated position relative to the other prism, the prism rotated on said interface about an axis normal to said interface, whereby the light path through one prism is displaced laterally in a first direction parallel to the plane of said interface, and longitudinally in a second direction normal to said first direction, relative to the light path through the other prism.

3. An optical system as claimed in claim 2, including a further pair of prisms in optical alignment with said pair of prisms, said further pair having a common interface and one base surface having a 50% reflective coating, and one prism rotated relative to the other prism about an axis normal to their interface, said lens structure positioned between said further pair of prisms and said imaging device.

4. An optical system as claimed in claim 3, the side surfaces of said prisms inclined at 45° to the base surfaces.

5. An optical system as claimed in claim 1, said means for displacing a part of the light path comprising a parallel sided glass plate positioned between said object and said prisms, said glass plate having a lateral axis and parallel faces, the axis extending normal to the light path and the glass plate inclined about said axis, said part of said path passing through said glass plate in a direction normal to said axis.

6. An optical system as claimed in claim 1, including a lens system positioned between said object and said pair of prisms.

7. An optical system as claimed in claim 1, said side surfaces of each of said prisms inclined at 45° to said base surface.